(12) United States Patent
George et al.

(10) Patent No.: US 7,730,099 B2
(45) Date of Patent: Jun. 1, 2010

(54) STORAGE AND RETRIEVAL OF RICHLY TYPED HIERARCHICAL NETWORK MODELS

(75) Inventors: Zacharia George, Cary, NC (US); Todd William Hansen, Cary, NC (US); Amish Shah, Apex, NC (US)

(73) Assignee: OPNET Technologies, Inc., Bethesda, MD (US)

( * ) Notice: Subject to any disclaimer, the term of this patent is extended or adjusted under 35 U.S.C. 154(b) by 256 days.

(21) Appl. No.: 11/506,665

(22) Filed: Aug. 18, 2006

(65) Prior Publication Data

US 2007/0050399 A1 Mar. 1, 2007

Related U.S. Application Data

(60) Provisional application No. 60/709,768, filed on Aug. 19, 2005.

(51) Int. Cl.
*G06F 7/00* (2006.01)
*G06F 17/30* (2006.01)
*G06F 15/173* (2006.01)
*G06F 17/50* (2006.01)
*G06G 7/62* (2006.01)

(52) U.S. Cl. ............... 707/796; 707/803; 709/223; 703/13

(58) Field of Classification Search ............ 707/102, 707/103 R; 709/223
See application file for complete search history.

(56) References Cited

U.S. PATENT DOCUMENTS 5,295,256 A * 3/1994 Bapat ............... 717/137
6,035,303 A * 3/2000 Baer et al. .......... 707/103 R
6,243,718 B1 * 6/2001 Klein et al. ............ 707/203
6,502,086 B2 * 12/2002 Pratt ..................... 707/1
7,155,728 B1 * 12/2006 Prabhu et al. .......... 719/316
2004/0236748 A1 * 11/2004 Coltrera ................. 707/9
2005/0033795 A1 * 2/2005 Wood .................. 709/200
2005/0257251 A1 * 11/2005 McKune et al. ......... 726/4
2007/0006036 A1 * 1/2007 Devas et al. ........... 714/38

OTHER PUBLICATIONS

Miller et al., Managing Database with Binary Large Objects, 1999, IEEE with collaboration of University of Maryland at Baltimore County and Boeing Is at NASA GSFC, pp. 1-9.*

* cited by examiner

*Primary Examiner*—James Trujillo
*Assistant Examiner*—Jorge A Casanova
(74) *Attorney, Agent, or Firm*—Robert M. McDermott, Esq.

(57) ABSTRACT

A Composite Pattern with BLOB data types is used to model a hierarchical network, and includes a path-like construct for locating each component within the network model. Database procedures are used to efficiently search, modify and retrieve individual nodes from the network model using the database server's memory pool so that client applications are not required to retrieve and deserialize the entire Composite-BLOB hierarchy in order to make modifications or search for individual elements, thereby substantially reducing the transfer of data between the application layer and database. To avoid the need for dynamic memory restructuring during deserialization, the size required to store component data at each composite is stored when the composite is serialized, and during deserialization, the size is retrieved and used to obtain sufficient memory for the deserialized composite.

24 Claims, 2 Drawing Sheets

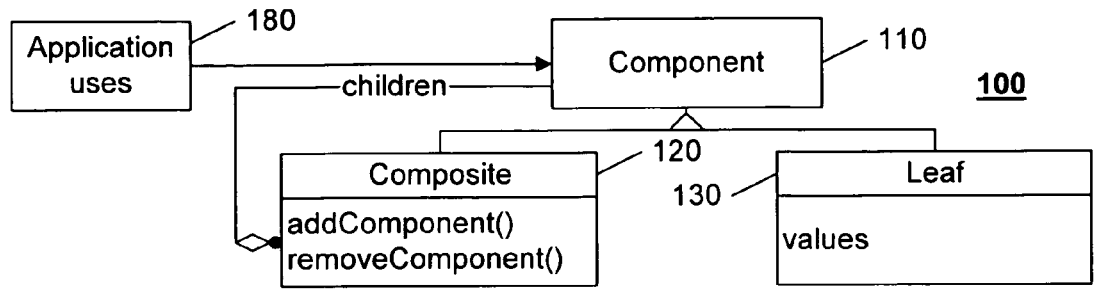
FIG. 1 [Prior Art]
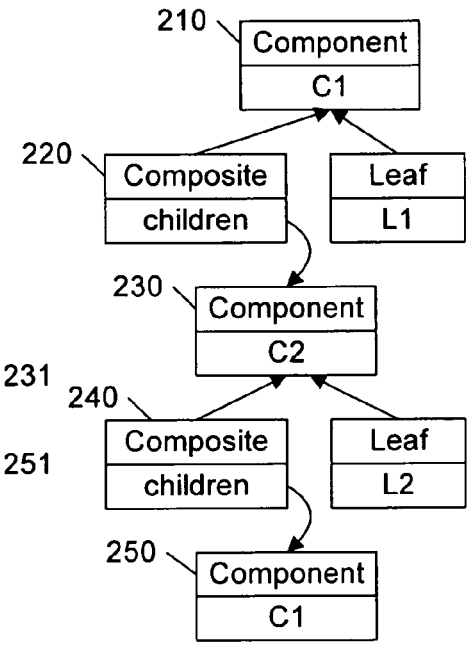
FIG. 2A
FIG. 2B
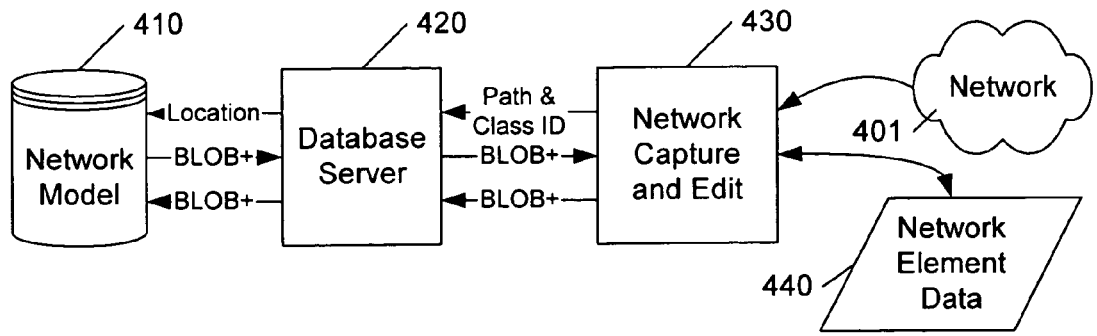
FIG. 4

STORAGE AND RETRIEVAL OF RICHLY TYPED HIERARCHICAL NETWORK MODELS

This application claims the benefit of U.S. Provisional Patent Application 60/709,768, filed 19 Aug. 2005.

BACKGROUND AND SUMMARY OF THE INVENTION

This invention relates to the field of network analysis tools and other tools that use a relational database to store and retrieve hierarchical data in a generic and schema agnostic fashion.

The effective management of large networks requires the use of tools that use one or more models of the network and each component within the network. To model the performance of a network, simulators and other tools effectively emulate the behavior of each of the devices in the network to determine how the system will perform as message traffic is propagated across the network, or to facilitate the diagnosis of the network as problems are reported. To properly emulate the behavior of each device, the configuration parameters, default settings, and so on associated with each device must be captured and included within the models, resulting in a very large collection of data being required even for relatively small networks.

The data that is captured and used to build network models is usually richly typed and hierarchical in nature. Storing such a network model in a relational database becomes an ongoing challenge in any implementation. In some implementations, the base software for data collection and management represent this richly typed hierarchical data in correspondingly complex database schemas. A disadvantage of such an approach, however, becomes apparent when new network routing and switching protocols, configurations, new device types and characteristics are invented and supported by different network equipment manufacturers. Often, a new capability or characteristic will require a change to the structure of the database schema, and, depending upon the robustness of the original structure, may reveal inherent incompatibilities with the new features and require a substantial restructuring. Even when the schema is robust, the changing and increasingly complex information in an actual network generally requires a continual update of the database schema and its table structure for each new release of the modeling software.

Techniques have been developed that use a composite data structure that allows for scalable and schema-agnostic storage and retrieval of richly typed hierarchical data. The hierarchical data is stored and retrieved using a single data structure, thereby allowing the software implementation and the database schema to be substantially immune to the necessity of remodeling increasing richness and complexity in the actual network data. Of particular note, the use of a single data structure allows the software designer to optimize read and write access to the database, and avoids having to reassess and/or rewrite the code for future releases.

A generic way of representing hierarchical data is via the use of a Composite Pattern and Binary Large Object (BLOB) data types.

As illustrated in FIG. 1, the basic unit of the data structure described in the Composite Pattern 100 consists of a Component class 110, a Composite class 120, and a Leaf class 130, wherein the Leaf and Composite classes are subclasses of the Component class. An instance of the Composite class may contain instances of other Components, while an instance of the Leaf class cannot contain instances of Component classes.

Because each Composite 120 of a Component 110 may contain one or more (lower-level) Components, the Composite Pattern 100 is well suited as a basic building block that is capable of representing any hierarchical data model of any depth. Since most information in a network model is richly typed and hierarchical in nature, the Composite Pattern 100 is often used to represent this data for use by application programs 180.

Most modern relational database implementations support a relational data structure called the Binary Large Object (or BLOB). A BLOB is a built-in data type that stores the data in the BLOB in a single cell of a database table. For all intents and purposes programmatic access to the BLOB is akin to accessing an integer or string value in a cell of the database table. BLOB data structures are typically used to store large amounts of data such as images or documents. BLOBs can be used to store data structures from programming languages as long as there is a way to convert the programming language entity to and from the binary data stream. The conversion of programming language data structure instances into binary byte streams is called serialization and the reverse process is called de-serialization. To model complex networks, the BLOB data structure is used to capture the hierarchical data built using the Composite Pattern. That is, an instance of the Composite Pattern is converted to a sequence of bytes (serializing the BLOB) that can then be stored as-is in the BLOB data type in a single cell of a database table. On retrieval, the sequence of bytes is transformed back (deserializing the BLOB) into the Composite Pattern for programmatic access.

The combination of the Composite Pattern and the BLOB data type allows for a schema agnostic representation of complex and hierarchical data; that is, the actual/internal schema is hidden within the BLOB, and the hierarchy is hidden by the generic nature of the Composite Pattern. As the complexity of the network model grows, there is no need to change the database schema. New data, like the older data, is represented using the Composite Pattern and stored in the relational database as a BLOB. Changing the data model within a single instance of the Composite Pattern or adding additional depth or pruning the hierarchy has no effect on the database schema. Furthermore, the data storage and retrieval of BLOB data values can be made efficient, because there is only a single data structure that needs to be addressed for database read and write access.

Although the combination of the Composite Pattern and the BLOB data type allows for the schema agnostic representation of complex and hierarchical data, and allows for changing the elements within the data model, or the hierarchy of the data model, without changing the database schema, this generic storage of hierarchical data has several disadvantages when used to store large and complex network models.

A particular disadvantage of this combination of the Composite Pattern and the BLOB data type for storing network models relates to accessing individual elements within the model. Because the BLOB data type masks the internal schema details, and the Composite Pattern is designed to be generic, and masks the actual network hierarchy, access to the elements within the hierarchy requires a top-down deserialization of the network model until the desired element is found. Correspondingly, a top-down serialization of the entire network model is required to subsequently store the Composite Pattern corresponding to the model. That is, for each access to add, remove or modify the contents of a BLOB, the application layer must read the entire Composite-BLOB data structure into memory, make the change to the particular item, then write the entire Composite-BLOB data structure back to persistent storage. This can prove to be highly CPU and memory inefficient for the large data volumes associated with network models.

In addition to the inherent inefficiency of having to deserialize and serialize the entire network model to access and modify a single network element, the inefficiency of this process is further compounded by the fact that conventional BLOB deserialization processes are generally not well suited to efficiently deserialize 'unpredictable' data structures. In conventional systems, because the BLOB hides the internal details, the deserialization process creates the structure as new components are deserialized. A conventional serialization process will write out each lower level component as it comes across it. During deserialization, each newly encountered component is added to the composite of its parent. This addition includes, for example, adding a 'child' record to a list of children, wherein the child record includes a reference to the location of the deserialized component within the memory and optionally other characteristics of the deserialized component. Typically, a default block of memory is allocated for storing the child records at the parent. As new children are encountered, this block of memory may be insufficiently sized to accommodate the newest child, and an additional block of memory must be allocated. However, because the table of child references is preferably stored as a contiguous block, for efficient indexing and processing, the addition of a new block of contiguous memory often requires a shift/restructure of previously allocated memory to accommodate this larger block. Additionally, because the block size is generally large, to reduce the required number of reallocations, substantial memory space can be wasted at each composite structure, when a new block is allocated but not filled by the remaining data.

It is an objective of this invention to facilitate searches through the network hierarchy that is conventionally masked by the use of a Composite Pattern with BLOB data types. It is a further objective of this invention to allow client applications to modify individual elements within a network model without requiring a deserialization of the entire BLOB hierarchy that is used to store the network model. It is a further objective of this invention to minimize the memory allocation overhead associated with the deserialization of hierarchical BLOBs.

These objectives, and others, are achieved by providing a Composite Pattern with BLOB data types that includes a path-like construct for locating each component within a network model. Each node in the hierarchy is uniquely identified by a name that is unique within the context of its parent node. The node is also uniquely identified within the entire hierarchy by its "path", using, for example, a concatenation of the names of the nodes in its ancestry. Database stored procedures are used to efficiently search, modify and retrieve individual nodes from the BLOB using the database server's memory pool so that client applications are not required to retrieve and deserialize the entire Composite-BLOB hierarchy in order to make modifications or search for individual elements, thereby substantially reducing the transfer of data between the application layer and database. To avoid the need for dynamic memory allocation during deserialization, the size of each pre-serialized composite is stored when the composite is serialized, and during deserialization, the size is retrieved and used to obtain sufficient memory for the deserialized composite via a single memory allocation.

BRIEF DESCRIPTION OF THE DRAWINGS

The invention is explained in further detail, and by way of example, with reference to the accompanying drawings wherein:

FIG. 1 illustrates an example prior art Composite Pattern with BLOB data types for storing network models.

FIGS. 2A and 2B illustrate an example component path identification for database access to each component in accordance with this invention.

FIG. 4 illustrates an example network model creation and editing system in accordance with this invention.

Throughout the drawings, the same reference numerals indicate similar or corresponding features or functions. The drawings are included for illustrative purposes and are not intended to limit the scope of the invention.

DETAILED DESCRIPTION

Figure 3:
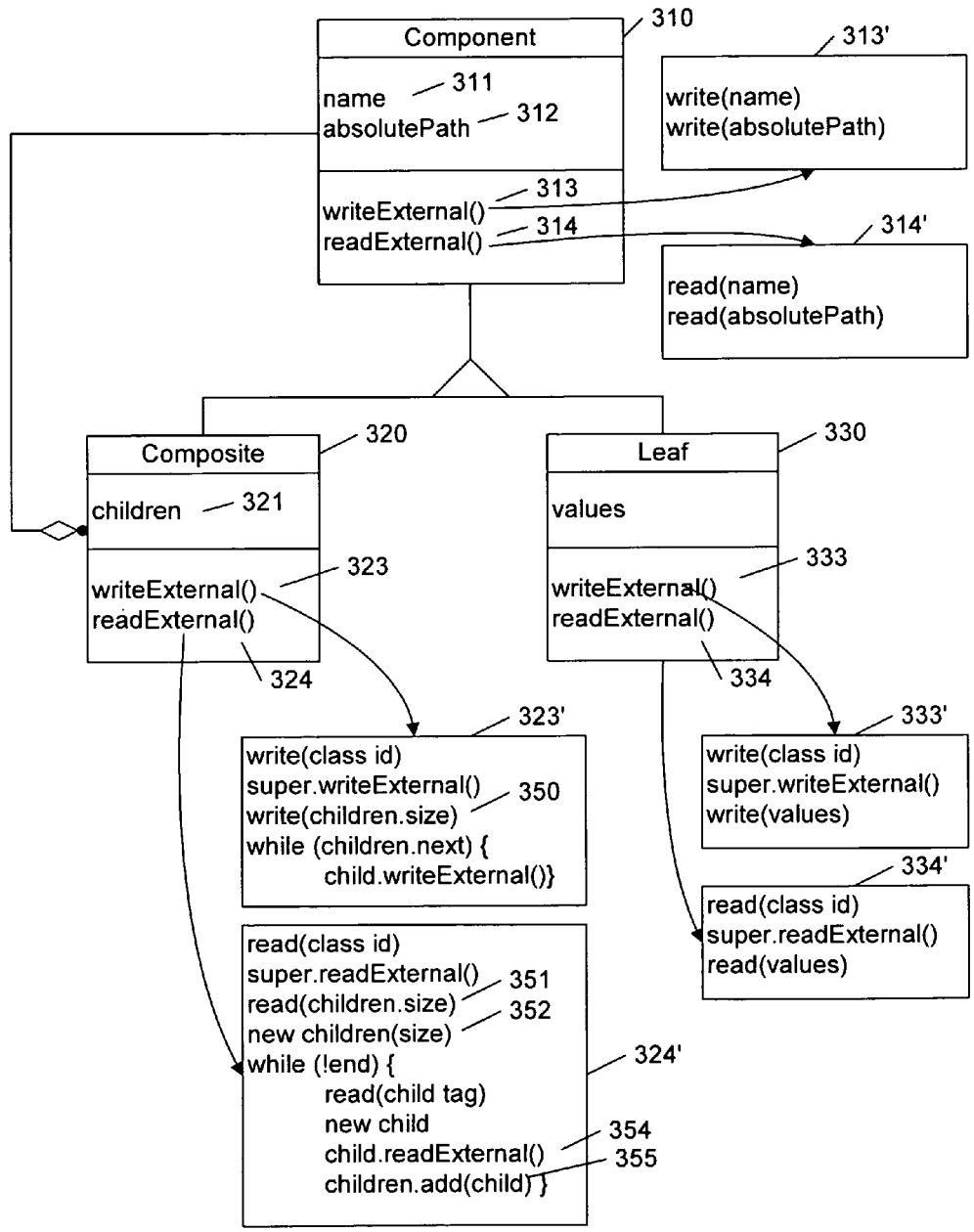
FIG. 3 illustrates an example modified Composite Pattern with BLOB data types for storing network models in accordance with this invention.

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

In this disclosure, the examples are presented using classes, methods, and structures common to the Java Programming Language. However, one of ordinary skill in the art will recognize that the principles of this invention are applicable using any language that includes a mechanism to convert programming language entity represented using the Composite Pattern to and from a stream of bytes. In like manner, although the invention is particularly well suited for representing hierarchical network models, one of ordinary skill in the art will recognize that the principles of this invention may be applied to other hierarchical models as well.

Also in this disclosure, a distinction is made between 'persistent storage' and 'active memory', or simply between 'storage' and 'memory'. For the purposes of this disclosure, 'persistent storage' corresponds to the storage of data for a time period that extends beyond the time period that an application that accesses the data is running, and 'active memory' corresponds to the storage of data while the application is running. Typically, persistent storage corresponds to storage in a file or other structure on a disc or other media that can be accessed at will, while active memory corresponds to storage of the data in program-specific data structures that can be readily accessed by the program, such as RAM memory. However, as used herein, the terms storage and memory do not necessarily imply a particular physical embodiment.

In accordance with a first aspect of this invention, each component of the modeled network includes one or both of a name and a path that facilitates the identification and retrieval of each component within the network model. In a preferred embodiment, the name of each component within a single composite is unique, and thereby the component can be uniquely identified within the hierarchy by a concatenation of the component names leading to this component from the top of the hierarchy, as illustrated in FIGS. 2A and 2B.

In FIG. 2B, a three-level hierarchy is illustrated. Component C1 210 is at the top-level and includes a composite 220 that includes a child component C2 230. As illustrated in FIG. 2A, the component path leading to this component 230 is a concatenation of the component names "/C1/C2" 231. Component 230 includes a composite 240 that identifies a child component, which coincidentally, has a component name of C1 250. In this case, the component path leading to component C1 250 is "/C1/C2/C1" 251, which is unique despite the commonality of the name C1 at different components 210, 250. Thus, by providing a unique name for each component at each composite, a unique path name can be created by merely concatenating each name. Other techniques for providing unique path names are common in the art.

FIG. 3 illustrates an example object model for a Composite pattern with BLOB data types in accordance with this invention.

Each component includes one or both of a name 311 and a path 312 that facilitates the identification and retrieval of each component within the network model, as discussed above. If a unique path can be identified by the component names, the absolutePath entry 312 is redundant, but is generally included to eliminate the need to repeatedly regenerate the concatenation of the component names. In like manner, if the absolutePath entry 312 is included, the component name 311 may be redundant, but is generally included to eliminate the need to extract the name from the path, and/or to facilitate global searching, such as "find all components named 'router'". As discussed below, the component name 311 and/or absolutePath 312 are explicitly written out during the serialization process, at block 313', thereby facilitating a direct database search for the BLOB that contains the component based on the name 311 and/or the path 312 of the component. In a preferred embodiment, for example, a database server associates the starting location of the component in persistent storage to the given name or path, so that the retrieval of the BLOB containing this component can be effected by merely initiating the retrieval from persistent storage at this location.

In accordance with a second aspect of this invention, the conventional default serialization process is replaced by explicit serialization methods 313', 323', 333' that write out key information to facilitate efficient search and retrieval. Correspondingly, the default deserialization process is also replaced by explicit deserialization methods 314', 324', 334'. In most programming languages, default object serialization is not optimized for efficient storage or searching within the serialized character stream. The default implementations generally require significant overhead to store class identifiers for each serialized object instance and rely on default object constructors to reconstitute object instances. In a preferred embodiment, the replacement serialization/deserialization methods reduce the overhead of storing the full class identifier for each instance in the hierarchy. The storage hierarchy is implemented with only a few unique class types so the length of class identifiers is reduced significantly during object serialization.

As illustrated in FIG. 3, the methods associated with component 310 include a writeExternal method 313 that replaces the default serialization of the component 310, the details of which are illustrated at block 313'. As discussed above, the writeExternal method 313' invokes a write(name) and a write (absolutePath) function to expressly write out the name 311 and path 312 of the component, so that a database access function can be subsequently used to search and retrieve the BLOB associated with the component based on the name or path, using database access techniques common in the art. The readExternal method 314 is detailed at 314', and includes a read of the component name and path as the component is being read back into memory. As noted above, the path name can alternatively be created based on the component name, and in that case, the read(absolutePath) function call would be replaced by a create(absolutePath) function call that performs that aforementioned concatenation of component names leading to the component in the network hierarchy.

The composite 320 identifies any lower-level components below the component 310 in the hierarchy as children 321, and includes a writeExternal method 323 and a readExternal method 324 that replace the default serialization and deserialization processes, respectively.

As detailed at 323', the composite writeExternal method 323 writes out the "class id" of the composite. Conventional serialization processes write out the entire class name, typically arranged in hierarchical packages, to avoid possible name space classes. In this invention, because only three classes are stored in the BLOB, name clashes are avoided, and by storing only the class identifier, rather than its full hierarchical class name, with each instance of Composite and Leaf during serialization, substantial storage savings are realized.

Thereafter, the method writes out the parameters that the composite 320 has inherited from its parent class, component 310, by executing the super.writeExternal method. In this manner, the serialized component will contain the data members of all its ancestors, so that the deserialized object can be created in its entirety.

Of particular note, in accordance with another aspect of this invention, the writeExternal method 323 includes an explicit write 350 of the size of the data associated with the children 321 at the composite 320. This size is the size required in active memory to store the references to all of the children data. By providing this size, the readExternal method 324 can be configured to request an allocation of memory that is sufficient to contain this block of reference data at the composite level when the data is being deserialized from the BLOB to a structure in active memory, thereby avoiding the need to perform repeated dynamic memory allocations restructuring of the composite as each lower level child of this composite is revealed as the BLOB is being deserialized. After writing the size of the references to the children data, each child component is written out, using the methods described above for writing out a component.

The readExternal method 324 is the complement of the writeExternal method 323. Of particular note, as introduced above, the readExternal method 324' includes a read 351 of the size required to store the children in active memory, and the method 324' requests an allocation of memory of this size via a "new" command 352. The subsequent while-loop reads 354 the BLOB corresponding to each child, then adds 355 the child to the aforementioned memory allocation for storing the references to the children of this composite.

The Leaf node 330 similarly includes writeExternal 333 and readExternal 334 methods that replace the default serialization and deserialization processes for this node. As detailed at 333', the characteristics/parameters that are inherited from the Component 310 are written out with the serialization of each leaf node, via the super.writeExternal method, as discussed above with regard to the writeExternal method 323 of the Composite 320.

FIG. 4 illustrates a block diagram of an example network model creation and editing system in accordance with this invention.

A network capture and edit application 430 is configured to receive information associated with the network 401 being modeled, using a variety of techniques ranging from direct user input to automated techniques that query the devices throughout the network 401 for their current configuration. The application 430 models the network 401 using a collection of data 440 for each network element, arranged in a hierarchical manner.

The network capture and edit application 430 uses a Composite Pattern with BLOB data types to store the network model. In accordance with the aforementioned aspects of this invention, the application 430 provides path and class identifiers to a conventional database server as potential keys for searching and retrieving the BLOBs that contain the component data. The term "BLOB+" is used in FIG. 4, to signal that the serialized component information also includes 'meta data', such as the aforementioned size of each set of children data, and other information that facilitates efficient data retrieval. When the data is being written, the database server 420 associates the location within the network model 410 in the persistent storage at which the component is being stored with the path and class identifiers of the component. That is, the component path information and class identifier tags provide unique location identifiers, which can be used to retrieve or modify any element within the tree.

To retrieve a particular component, the application 430 provides the path and class identifier to the database server 420, and the database server 420 retrieves the corresponding data block from the network model 410, based on the location associated with these identifiers. Simple or complex search results can be return to the application 430, for viewing or editing. By indexing or keying the stored data to the path and class identifiers, a deserialization of the entire network model is not required to access individual components or sets of components.

If a modification to the component data 440 is made, the network capture and edit application 430 merely repeats the same method used to create the network model 410. That is, the application 430 provides the path and class identifiers to the database server 420, and the server 420 stores the modified data at a location that it associates with these identifiers. Preferably, the location is the same location that had previously been associated with these identifiers, so that other references to this component remain unchanged. Alternatively, the database server 420 is configured to automatically maintain consistency among references as particular locations change, using techniques common to the art of database servers.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A method comprising:

defining, by a network modeling system, each component of a plurality of components in a hierarchy using a component class that includes a composite class and leaf class, wherein the composite class is configured to include, as required, children component classes, defining, by the network modeling system, a unique identifier of each component, forming a plurality of component identifiers, creating, by the network modeling system, a Binary Large Object (BLOB) as a single serial string of bytes that includes a representation of a schema and data corresponding to each component at a unique location in the Binary Large Object corresponding to the component, associating, by the network modeling system, the unique location in the Binary Large Object with the unique identifier of each component, and storing, by the network modeling system, the Binary Large Object, and storing, by the network modeling system, the component identifier, the unique location of each component, and a size of the component, wherein the size corresponds to a memory requirement to store an entirety of the component based on the schema, including the data corresponding to the leaf class and each of the children component classes, if any, to facilitate the select retrieval of each component.

2. The method of claim 1, including:

receiving an identifier of a target component, searching the plurality of component identifiers for the identifier of the target component to find the unique location in the Binary Large Object and the size corresponding to the identifier, allocating a segment of memory corresponding to the target component based on the size, reading the representation of the schema and data from the unique location in the Binary Large Object corresponding to the identifier, and creating a component data item in the segment of memory, based on the schema and data corresponding to the target component.

3. The method of claim 2, including modifying the component data item, creating a modified serial string of bytes that includes a representation of the schema and data corresponding to the component data item, and storing the modified serial string of bytes at the unique location in the Binary Large Object corresponding to the identifier of the target component.

4. The method of claim 3, including modifying the unique location and the size corresponding to the identifier of the target component to facilitate storing the modified serial string of bytes and subsequently creatin a modified component data item.

5. The method of claim 1, wherein each child component of the children components of each composite class includes a component name that is unique within the composite class, and the unique identifier of each component corresponds to a concatenation of component names.

6. The method of claim 1, wherein each leaf class includes values associated the component.

7. The method of claim 1, wherein the plurality of components in the hierarchy includes elements of a network.

8. The method of claim 1, wherein storing the Binary Large Object includes storing parameters that the composite class has inherited from the component class.

9. A system comprising:
a network capture module that is configured to facilitate creation of a first hierarchical model of a network that includes a schema that facilitates analysis of the network;
a database module that is configured to store a second hierarchical model of a plurality of components of the network in a Binary Large Object (BLOB),
wherein the second hierarchical model is configured such that:
each component of the plurality of components is stored using:
a component class that includes a composite class and leaf class, the composite class being configured to include, as required, children component classes, and
a serial string of bytes in the Binary Large Object that includes a representation of the schema and data corresponding to each component; and
each component is identifiable by a unique identifier that is associated with a unique location in the Binary Large Object at which the serial string of bytes corresponding to the component is stored, and a size of the component, wherein the size corresponds to a memory requirement to store an entirety of the component based on the schema, including the data corresponding to the leaf class and each of the children component classes, if any, and
the database module is configured to store the unique identifier, the unique location, and the size corresponding to each component, to facilitate select retrieval of each component from the Binary Large Object independent of other components in the second hierarchical model.

10. The system of claim 9, wherein
the network capture module is configured to facilitate editing of a select component that is stored in the second hierarchical model;
the database module is configured to:
receive the unique identifier of the select component from the network capture module,
determine the unique location and size of the select component in the Binary Large Object corresponding to the unique identifier of the select component,
retrieve the select component from the Binary Large Object based on the unique location of the select component, and
provide the select component to the network capture module; and
the network capture module is configured to allocate a segment of memory based on the size, and create a component data item in the segment of memory corresponding to the select component, based on the schema and data that is represented in the serial string of data in the Binary Large Object corresponding to the select component.

11. The system of claim 10, wherein
the network capture module is configured to:
receive changes to the component data item in memory corresponding to the select component, and
create a modified serial string of bytes that includes a representation of the schema and data corresponding to the component data item, and
the database module is configured to store the modified serial string of bytes at the unique location in the Binary Large Object corresponding to the identifier of the select component.

12. The system of claim 11, wherein the database module is configured to modify the unique location and size corresponding to the identifier of the select component to facilitate storing the modified serial string of bytes and subsequently creating a modified component data item.

13. The system of claim 9, wherein each child component of the children components of each composite class includes a component name that is unique within the composite class, and the unique identifier of each component corresponds to a concatenation of component names.

14. The system of claim 9, wherein each leaf class includes values associated the component.

15. The system of claim 9, wherein the plurality of components in the second hierarchical model includes elements of a network.

16. The system of claim 9, wherein the serial string of bytes includes parameters that the composite class has inherited from the component class.

17. A computer program stored on a computer-readable media that, when executed by a processor, is configured to cause the processor to:
access a first hierarchical model of a network in a memory structure that includes a schema that facilitates analysis of the network;
create a second hierarchical model of a plurality of components of the network that is suitable for storage on a persistent storage media as a Binary Large Object (BLOB),
wherein the second hierarchical model is created such that:
each component of the plurality of components is stored using:
a component class that includes a composite class and leaf class, the composite class being configured to include, as required, children component classes, and
a serial string of bytes in the Binary Large Object that includes a representation of the schema and data corresponding to each component; and
each component is identifiable by a unique identifier that is associated with a unique location in the Binary Large Object at which the serial string of bytes corresponding to the component is stored, and a size of the component, wherein the size corresponds to a memory requirement to store an entirety of the component based on the schema, including the data corresponding to the leaf class and each of the children component classes, if any, and
the program is configured to cause the processor to store the unique identifier, the unique location, and the size corresponding to each component, to facilitate retrieval of the component independent of other components in the second hierarchical model.

18. The computer program of claim 17, which causes the processor to:

identify a select component of the plurality of components, determine the unique identifier and size of the select component, retrieve the select component from the persistent storage media based on the unique location in the Binary Large Object associated with the identifier of the select component, allocate a segment of memory based on the size, and create a component data item in the segment of memory corresponding to the select component, based on the schema and data that is represented in the serial string of data corresponding to the select component.

19. The computer program of claim 18, which causes the processor to:

receive changes to the component data item in memory corresponding to the select component, and create a modified serial string of bytes that includes a representation of the schema and data corresponding to the component data item, and store the modified serial string of bytes at the unique location corresponding to the identifier of the select component.

20. The computer program of claim 19, which causes the processor to modify the unique location and size corresponding to the identifier of the select component to facilitate storing the modified serial string of bytes and subsequent creating of a modified component data item.

21. The computer program of claim 17, wherein each child component of the children components of each composite class includes a component name that is unique within the composite class, and the unique identifier of each component corresponds to a concatenation of component names.

22. The computer program of claim 17, wherein each leaf class includes values associated with the component.

23. The computer program of claim 17, wherein the plurality of components in the second hierarchical model includes elements of a network.

24. The computer program of claim 17, wherein the serial string of bytes includes parameters that the composite class has inherited from the component class.

* * * * *